United States Patent [19]

Wheelock et al.

[11] Patent Number: 4,522,706

[45] Date of Patent: Jun. 11, 1985

[54] HYDROCARBON TREATING PROCESSES USING PEROVSKITE-CONTAINING CATALYTIC COMPOSITIONS

[75] Inventors: Kenneth S. Wheelock; Robert C. Schucker, both of Baton Rouge, La.

[73] Assignee: Exxon Research & Engineering Co., Florham Park, N.J.

[21] Appl. No.: 564,843

[22] Filed: Dec. 23, 1983

Related U.S. Application Data

[63] Continuation-in-part of Ser. No. 388,900, Jun. 16, 1982, abandoned.

[51] Int. Cl.$^3$ .................... C10G 11/04; C10G 11/18
[52] U.S. Cl. .................................... 208/121; 208/213; 502/525
[58] Field of Search ................... 208/121; 502/525

[56] References Cited

U.S. PATENT DOCUMENTS

| | | | |
|---|---|---|---|
| 3,595,809 | 7/1971 | Kehl | 502/525 |
| 4,055,513 | 10/1977 | Wheelock | 502/525 |
| 4,102,777 | 7/1978 | Wheelock | 208/121 |
| 4,134,852 | 1/1979 | Volin | 502/525 |
| 4,151,123 | 4/1979 | McCann | 502/525 |
| 4,152,299 | 5/1979 | Gandhi et al. | 502/525 |
| 4,179,409 | 12/1979 | Gladrow et al. | 208/120 |
| 4,208,269 | 6/1980 | Gladrow et al. | 208/120 |
| 4,269,696 | 5/1981 | Metrailer | 208/120 |

Primary Examiner—Delbert E. Gantz
Assistant Examiner—O. Chaudhuri
Attorney, Agent, or Firm—Marthe L. Gibbons

[57] ABSTRACT

Hydrocarbon treating processes such as catalytic cracking and fluid coking are provided in which a perovskite-containing catalytic composition is used as catalyst. The perovskite-containing catalytic composition is produced by interrupting the reaction of perovskite precursors after formation of at least 60 wt. % perovskite and before formation of more than 99 wt. % perovskite from the precursors.

10 Claims, 2 Drawing Figures

HYDROCARBON TREATING PROCESSES USING PEROVSKITE-CONTAINING CATALYTIC COMPOSITIONS

This application is a continuation-in-part of U.S. patent application No. 388,900 filed June 16, 1982, now abandoned, the teachings of which are hereby incorporated by reference.

BACKGROUND OF THE INVENTION

1. Field of the Invention

This invention relates to hydrocarbon treating processes using perovskite-containing compositions as catalysts.

2. Description of the Prior Art

U.S. Pat. Nos. 4,208,269 and 4,179,009 disclose perovskite catalysts and their use in hydrocarbon conversion processes.

U.S. Pat. Nos. 4,055,513 and 4,102,777 disclose high surface area perovskite catalysts and their use in hydrocarbon conversion processes.

U.S. Pat. No. 4,269,696 discloses an integrated fluid coking and gasification process in which a solid cracking catalyst is added to the coker chargestock.

SUMMARY OF THE INVENTION

In accordance with the invention there is provided, a hydrocarbon treating process which comprises contacting a hydrocarbonaceous feed at hydrocarbon treating conditions with a catalyst comprising a composition comprising at least about 60 wt.% perovskite and less than about 99 weight percent of a perovskite $ABO_3$, and a non-perovskite reaction residue, wherein A is a cation of at least one metal, wherein B is a cation different from cation A of at least one metal, said perovskite comprising at least one transition metal cation selected from the group consisting of elements having atomic numbers ranging from 21 through 30, from 39 through 48, from 57 through 80, and from 89 through 92, said composition having been prepared by reacting a component A comprising said cation A and a component B comprising said cation B at a temperature and for a time sufficient to form said perovskite $ABO_3$ and interrupting said reaction after formation of at least about 60 wt.% perovskite and before the formation of more than about 99 weight percent of said perovskite $ABO_3$, based on the weight of said component A plus component B, whereby the remainder of said composition is a non-perovskite residue resulting from said reaction.

DETAILED DESCRIPTION OF THE INVENTION

Figure 1:
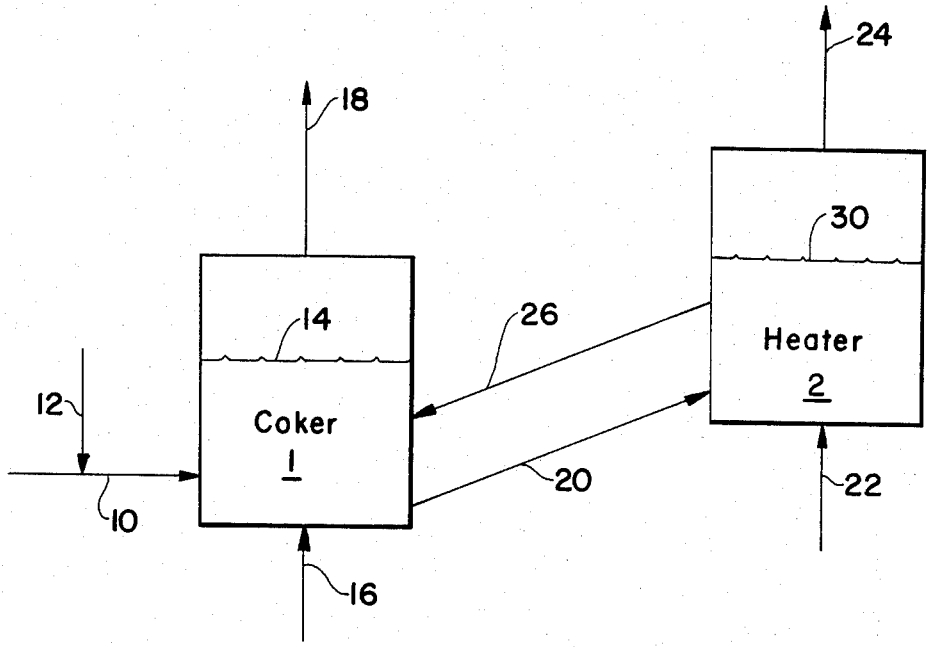
FIG. 1 is a schematic flow plan of one embodiment of the invention.

Methods for the preparation of perovskites are well known. The methods may be anhydrous or aqueous. Description of methods of perovskite preparation can be found in Structure, Properties and Preparation of Perovskite-Type Compounds by F. S. Galasso published by Pergamon Press, Oxford, 1969. To prepare the perovskite-containing compositions which are useful as catalysts in the hydrocarbon treating processes of the present invention, any conventional method of preparing the perovskites may be used provided that the reaction of perovskite precursors is interrupted after formation of at least 60 wt.% perovskite and before formation of more than about 99 weight percent perovskite, preferably after formation of at least about 65 wt.% perovskite and before formation of more than about 99 weight percent perovskite, in the reaction mixture, based on the weight of the reactants (i.e., perovskite precursors). The resulting perovskite-containing composition comprises the perovskite and a non-perovskite residue resulting from the reaction. The residue is believed to be unreacted metal oxides and intermediate compounds which do not yet possess the perovskite structure.

The term "perovskite" is intended herein to designate mixed metal oxides having the ideal and nonideal perovskite crystalline structure. The ideal perovskite crystalline structure is defined by the empirical formula $ABO_3$ in which A and B are cations of different metals and in which the A cation is coordinated to 12 oxygen atoms while the B cation occupies octahedral sites and is coordinated to 6 oxygen atoms. The ideal perovskite structure is cubic; however, few compounds have this ideal structure. A more complete description of the perovskite structure can be found in Structural Inorganic Chemistry, A. F. Wells, 3rd Edition, Oxford, Clarendon Press, 1962, pages 494 to 499. It should be noted that cation A may be more than one metal and cation B may be more than one metal. In general, the algebraic sum of the ionic charges of the two or more metals (cations) of the perovskite equals 6.

The perovskites useful in the composition of the present invention, which have catalytic activity, are perovskites in which at least one cation of either site A or site B is a transition metal cation. The term "transition metal" is intended herein to designate elements of the Periodic Table of Elements having atomic numbers ranging from 21 through 30, from 39 to 48, from 57 to 80 and from 89 through 92. The Periodic Table referred to herein is in accordance with Handbook of Chemistry and Physics, published by Chemical Rubber Publishing Company, Cleveland, Ohio, 45th Edition, 1964.

Preferred transition metal cations include lanthanum, cobalt, cerium, hafnium, chromium, zirconium, and mixtures thereof. Preferably, the perovskite additionally comprises an alkaline earth metal cation selected from the group consisting of beryllium, magnesium, calcium, strontium, barium and mixtures thereof. More preferably, the perovskites are barium zirconate and barium hafnate. Most preferably, the perovskite is barium zirconate.

The perovskites are generally prepared by heating stoichiometric mixtures of starting materials. In anhydrous methods of preparing perovskites, the starting materials may be oxides of the desired metal cations or salts which are convertible to oxides by heating in an environment which may be oxidizing such as air or an oxygen-containing gas. The salts may be carbonates; salts of carboxylic acids such as acetates, oxalates and tartrates; salts of the acids of sulfur such as sulfides, sulfites and sulfates; halogen acid salts which are convertible to oxides, salts of the acid of nitrogen such as nitrates and nitrites. The mixtures of the starting materials are typically heated to sintering temperatures which vary depending on the components used. Suitable temperatures range from about 600° to 2000° C., preferably from about 800° C. to 1500° C. The product resulting from the heating step is then ground or ball milled to reduce its particle size and the resulting particles are again heated. In several prior art processes, the heating and particle size reduction is repeated until substantially all the starting materials, that is, the perovskite precursors, have been converted to a perovskite having cations corresponding to the cations of the starting materials. The calcination may also be conducted with concurrent particle size reduction. In contrast, in accordance with the present invention, the heating of the reaction mixture of starting materials is interrupted after the reaction product comprises at least about 60 wt.% perovskite, preferably at least about 65 wt.% perovskite and before the reaction product comprises more than about 99 weight percent perovskite, the weight being based on the total weight of the reactants, that is, on the weight of the metal oxides used to form the perovskite. A preferred heating temperature is about 1250° C. for about 60 to 90 minutes. The nature of the remaining residue is difficult to define since it comprises any unreacted metal as well as intermediate products of the reaction which have not yet been converted to the perovskite structure.

Instead of preparing the perovskites by an anhydrous method such as the one described above, an aqueous method may be employed in which salts of the metals containing the desired cations are reacted with a basic reactant to precipitate a precursor of the perovskite. The precipitate is then dried and calcined to form the perovskite. Since the aqueous method also produces metal oxides, interruption of the process to control the amount of perovskite produced in the resulting composition is also applicable to such a method.

It has been found that the perovskite-containing composition which results from the interruption of the perovskite formation produces a composition which has catalytic properties which are superior for use in certain processes than the catalytic property of the perovskite alone, that is, than use of 100% perovskite. The perovskite-containing composition, which comprises at least 60 weight percent and not more than 99 weight percent perovskite plus reaction residue, may be used as catalyst as such or the composition may be composited with other catalytic materials and with supports and other components which may be catalytic or inert.

The perovskite-containing composition may be composited with conventional supports such as silica, alumina, silica-alumina, silica-zirconia, other inorganic oxides, carbon, etc. to form composite catalysts. In the event of composite catalysts, the weight percent of perovskite defined herein is still based only on the weight of perovskite plus perovskite precursor reactants and not on the total weight of the composite catalyst.

The perovskite-containing catalysts of the present invention are suitable for use as catalysts in hydrocarbon treating processes including hydrocarbon conversion processes such as catalytic cracking, catalytic fluid coking, reforming, hydrogenation, oxidation, dehydrogenation, isomerization, hydrocracking, hydrodesulfurization, denitrogenation, demetallization, etc. The catalysts comprising the perovskite-containing composition of the present invention are particularly suited for use in cracking processes such as catalytic cracking and catalytic fluid coking, including integrated fluid coking and gasification processes, using high boiling point hydrocarbonaceous feeds having high content of metal contaminants and a high Conradson carbon residue. Suitable catalytic cracking conditions include a temperature ranging from about 750° to about 1300° F. and a pressure ranging from about 0 to about 150 psig, typically from about 0 to about 45 psig. The catalytic cracking process may be carried out as a fixed bed, moving bed, ebullated bed, slurry, transferline (dispersed phase) or fluidized bed operation. It should be noted that the catalyst, when used in a specified hydrocarbon treating process, can be employed with any of the conventional hydrocarbon feeds used in the desired process, such as naphtha, gas oils, residuals oils, coal and mixtures thereof.

DESCRIPTION OF THE PREFERRED EMBODIMENT

Referring to FIG. 1, a carbonaceous chargestock having a Conradson carbon content of at least 5 weight percent is passed by line 10 into a coking zone in coker 1 in which is maintained a fluidized bed of solids (e.g. coke particles of 40 to 1000 microns in size) having an upper level indicated at 14. Suitable carbonaceous chargestocks for the fluid coking stage include heavy hydrocarbonaceous oils; heavy and reduced petroleum crude; petroleum atmospheric distillation bottoms; petroleum vacuum distillation bottoms; pitch; asphalt; bitumen; other heavy hydrocarbon residues; tarsand oil; shale oil; liquid products derived from coal liquefaction processes, including coal liquefaction bottoms; coal; coal slurries, and mixtures thereof. Typically these feeds have a Conradson carbon residue of at least 5 weight percent, generally from about 5 to about 50 weight percent, preferably above about 7 weight percent (as to Conradson carbon residue, see ASTM Test D 189-65) and typically a high content of metal contaminants. A catalyst comprising a composition comprising a perovskite, such as barium zirconate, and a residue obtained in the preparation process of the present invention is added to the carbonaceous chargestock by line 22. Additionally or alternatively, the perovskite-containing catalyst can be added directly to the coking zone or indirectly by a recycle solids stream. The perovskite-containing catalyst is added to the chargestock desirably in an amount ranging from about 0.1 to about 10 weight percent, preferably from about 1 to about 10 weight percent, preferably from about 1 to about 10 weight percent, based on the initial coker chargestock.

A fluidizing gas is admitted to coker 1 by line 16 in an amount sufficient to maintain a superficial gas velocity in the range of about 0.3 to about 5 feet per second. The fluidizing gas may comprise steam, gaseous hydrocarbons, vaporized normally liquid hydrocarbons, hydrogen, hydrogen sulfide and mixtures thereof. Typically, the fluidizing gas used will comprise steam. Solids at a temperature above the coking temperature, for example, at a temperature of 100 to 800 Fahrenheit degrees in excess of the actual operating temperature of the coking zone is admitted to coker 1 by line 26 in an amount sufficient to maintain the coking temperature in the range of about 850 to about 1400° F., preferably in the range of about 900° to about 1200° F. The total pressure in the coking zone is maintained in the range of about 0 to about 150 pounds per square inch gauge (psig), preferably in the range of about 5 to about 100 psig. The lower portion of the coker serves as a stripping zone to remove occluded hydrocarbons from the solids. The vaporous products include gaseous hydrocarbons and normally liquid hydrocarbons are well as other gases which are introduced into the coker as fluidizing gas. The vapor phase product is removed from coker 1 by line 18 for scrubbing and fractionation in a conventional way. If desired, at least a portion of the vaporous effluent may be recycled to the coker as fluidizing gas. The stream of heavy materials condensed from the vaporous coker effluent may be recycled to the coker or the coker may be operated in a once-through manner, that is, without recycle of the heavy material to the coker.

A stream of stripped solids (i.e., cold solids) are withdrawn from the coker by line 20 and introduced into a fluid bed of hot coke having a level 30 in heater 2. The heater may be operated as a conventional coke burner such as disclosed in U.S. Pat. No. 2,881,130, which is hereby incorporated by reference. When the heater is operated as a burner, an oxygen-containing gas, typically air, is introduced into heater 2 by line 22. The combustion of a portion of the solid carbonaceous deposition on the solids with the oxygen-containing gas provides the heat required to heat the colder particles. The temperature in the heating zone (burning zone) is maintained in the range of about 1200° to about 1700° F. Alternatively, heater 2 can be operated as a heat exchange zone such as disclosed in U.S. Pat. Nos. 3,661,543; 3,702,516 and 3,759,676, the teachings of which are hereby incorporated by reference. Hot solids are removed from the fluidized bed in heater 2 and circulated to the coker by line 26 to supply heat thereto. If desired, the perovskite-containing catalyst may be recovered from the heating zone or from the gasification zone of an integrated coking and gasification process and the recovered perovskite catalyst may be recycled to the coker chargestock or to the dilute phase of the coker, as described in U.S. Pat. No. 4,269,696, the teachings of which are hereby incorporated by reference.

The following examples are presented to illustrate the invention.

EXAMPLE 1

Perovskites were prepared as follows: 544.98 gm of commercially available glass-polishing grade zirconium dioxide ($ZrO_2$), 94–97% pure, and 665.32 gm of technical grade barium oxide (BaO) were ground together. This mixture was fused at 1000° C. for 16 hours. The resulting product is designated herein Sample K. After cooling, the preparation was ground to pass through a 48 mesh screen and fused again for 16 hours. After cooling, the preparation was ground to pass through a 48 mesh screen. A sample, L, was analyzed by X-ray powder diffraction. The remainder of the preparation was again fused at 1000° C. for 16 hours. After cooling, the mixture was ground to pass through a 48 mesh screen. A sample M was analyzed by X-ray powder diffraction. In sample L, the major component was $BaZrO_3$ along with two minor components (1) $ZrO_2$, unreacted precursor, and (2) $Ba_3Zr_2O_7$, an intermediate product. In sample M, the material was essentially $BaZrO_3$ with traces of $ZrO_2$. Sample L was a perovskite composition in accordance with the present invention.

The second preparation utilized exactly the same procedure starting with 544.98 gm of glass-polishing grade zirconium dioxide and 665.56 gm of technical grade barium oxide. Samples were reserved after each grinding step for a thermogravimetric evaluation of the ability of the material to catalyze the coking reaction. Sample L was a perovskite-containing composition in accordance with the present invention.

EXAMPLE 2

An Arabian heavy vacuum residuum having an initial boiling point above 1050° F. at atmospheric pressure was analyzed by thermogravimetric analysis and the rate of volatilization measured.

Figure 2:
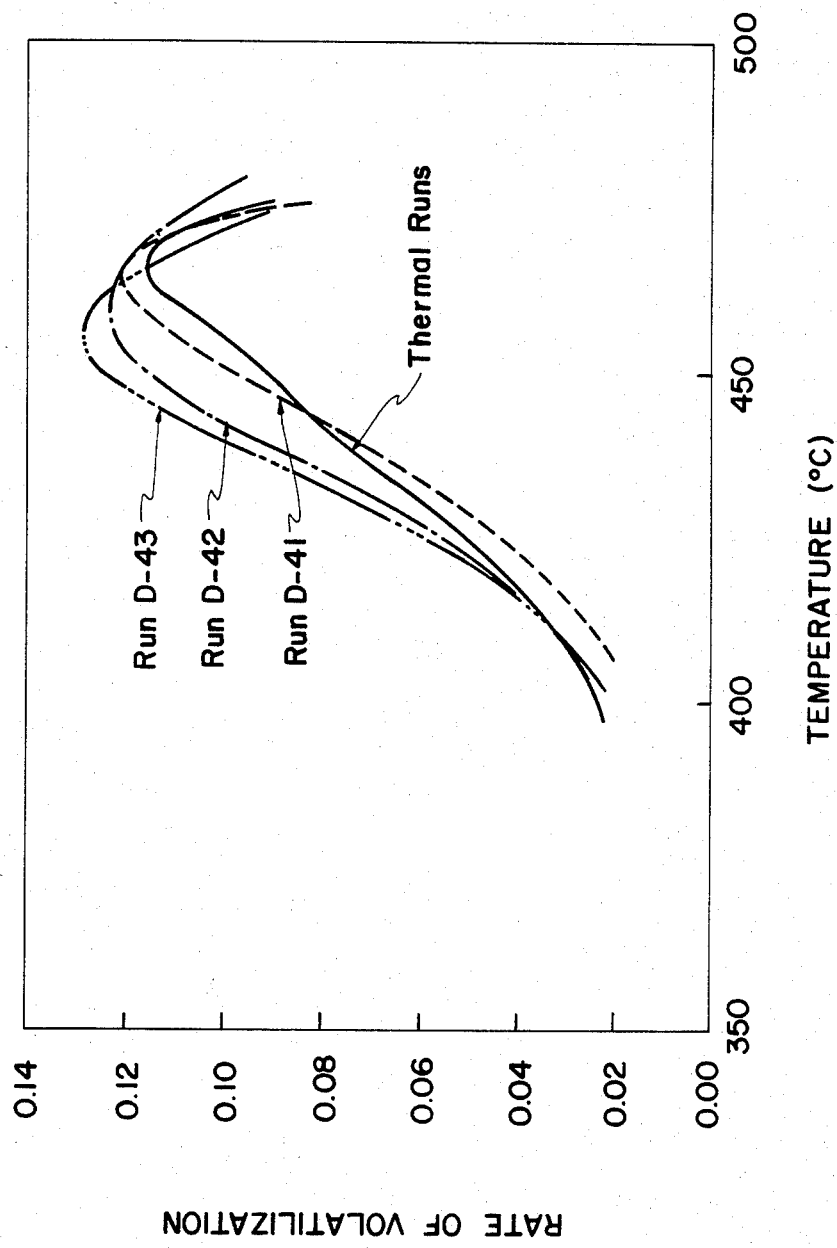
FIG. 2 is a graph showing rate of volatilization of a residuum feed versus temperature.

The following runs were made:
Run D-39—Thermal Base Case
Run D-40—Thermal Base Case Replicate
Run D-41—$BaZrO_3$ composition after first fusion using Sample K
Run D-43—$BaZrO_3$ composition after second fusion using Sample L
Run D-42—$BaZrO_3$ composition after third fusion using Sample M The results are summarized in FIG. 2.

Run No. D-43, which is a run in accordance with the present invention, showed greater activity than Run No. D-42 which was a run utilizing substantially 100% barium zirconate perovskite. Run D-43 also showed greater activity than the thermal runs which are carried out without the addition of any catalyst.

The amount of perovskite in the samples used in these runs is shown in Table I:

TABLE I

| Sample | Perovskite, wt. % | Maximum Volatilization Rates (min. −1) |
|---|---|---|
| K | 35 ± 10 | 0.132 |
| L | 75 ± 10 | 0.141 |
| M | 100 ± 10 | 0.136 |

Approximately 96.68 grams (0.50 mole) of reagent grade barium carbonate was added with 61.61 grams (0.50 mole) of commercial polishing grade zirconium dioxide to a small milling jar and the components were ball milled for approximately 16 hours. Small samples of the milled precursors were then put into individual alpha alumina boats and fired at 1250° C. for the lengths of time shown below. The muffle furnace used was capable of rapid heat up and consequently time at temperature could be monitored accurately. Samples were withdrawn from the muffle hot at the specified times and cooled to room temperature. Catalytic activity of the samples produced in this way was measured by the standard thermogravimetric means using Arab Heavy vacuum residuum. The milled but unfired precursor solids were also treated for catalytic activity. In addition to the tga analysis, all samples were submitted for X-ray powder diffraction in order to follow the growth of the barium zirconate phase as a function of time at 1250° C. Percent crystallinity as shown in the following table was calculated using the height of the major barium zirconate line at 2.96 A at infinite (very long) times as the reference. By dividing the height of the 2.96 A peak, $I_0$, by the height of that same peak at infinite time, $I_{0\infty}$, an approximation of the total crystallinity could be obtained.

TABLE II

| Time at 1250° C. (hr) | Maximum Rate of Volatilization (l/min) | Percent Crystallinity ($I_0/I_{0\infty}$) Raw | Normalized |
|---|---|---|---|
| 0 | 0.127 | 0 | 0 |
| 0.5 | 0.145 | 55 | 49 ± 6 |
| 1.0 | 0.164 | 83 | 74 ± 9 |
| 1.5 | 0.154 | 99 | 88 ± 11 |
| 3.0 | 0.141 | 112 | 100 ± 12 |
| 5.5 | 0.138 | 105 | 94 ± 11 |

TABLE II-continued

| Time at 1250° C. (hr) | Maximum Rate of Volatilization (l/min) | Percent Crystallinity ($I_0/I_{0\infty}$) Raw | Percent Crystallinity ($I_0/I_{0\infty}$) Normalized |
|---|---|---|---|
| 21.5 | 0.128 | 94 | 84 ± 10 |
| 117.0 | 0.121 | 98 | 88 ± 11 |

As can be seen from the above table, the non-crystalline precursors had no activity and as the firing proceeded, both the activity and crystallinity increased. The maximum activity was found at between 1 and 1.5 hours at a time when the crystallinity was between about 65 (i.e., 74-9) and 99 weight percent. It should also be noted that the position of the maximum activity versus firing time plot is a function of firing temperature and the composition of the starting precursor mixture.

What is claimed is:

1. A fluid coking process which comprises contacting a hydrocarbonaceous feed having a Conradson carbon ranging from about 5 to about 50 weight percent at fluid coking conditions with a catalyst comprising a composition comprising at least about 60 weight percent perovskite and less than about 99 weight percent of a perovskite $ABO_3$, and a non-perovskite reaction residue, wherein A is a cation of at least one metal, wherein B is a cation different from said cation A of at least one metal, said perovskite comprising at least one transition metal cation selected from the group consisting of elements having atomic numbers ranging from 21 through 30, through 39 through 48, from 57 through 80, and from 89 through 90, said composition having been prepared by reacting a component A comprising said cation A and a component B comprising said cation B at a temperature ranging from about 600° to about 2000° C. and for a time sufficient to form said perovskite $ABO_3$ and interrupting said reaction after formation of at least about 60 weight percent perovskite and before the formation of more than about 99 weight percent of said perovskite $ABO_3$, based on the weight of said component A plus component B whereby the remainder of said composition is a non-perovskite residue resulting from said reaction.

2. The process of claim 1 wherein said reaction is interrupted after the formation of at least about 65 weight percent of said perovskite $ABO_3$.

3. The process of claim 1 wherein component A is a metal oxide or compound convertible to a metal oxide and wherein said component B is a metal oxide or compound convertible to a metal oxide, and wherein component A and component B are reacted by heating said component A and component B for a time sufficient to convert at least a portion of said component A and said component B to said perovskite.

4. The fluid coking process of claim 3 wherein said component A and said component B are heated for a time up to about 32 hours.

5. The process of claim 3 wherein said component A and said component B are heated at a temperature ranging from about 800° to about 1500° C. with alternating particle size reduction of the resulting heated solid product.

6. The process of claim 1 wherein at least one of said cations is selected from the group consisting of beryllium, magnesium, calcium, strontium, barium and mixtures thereof.

7. The process of claim 1 wherein said perovskite is selected from the group consisting of barium zirconate, barium hafnate and mixtures thereof.

8. The fluid coking process of claim 1 wherein said fluid coking conditions include a temperature ranging from about 850° to about 1400° F.

9. The fluid coking process of claim 1 wherein said heating is conducted at a temperature of about 1250° C. for about 60 to 90 minutes.

10. The process of claim 1 wherein said catalyst consists essentially of said perovskite and said residue.

* * * * *